235-382 SR

OR 4,257,030

United States Patent [19] x 340-825.31

Bruhin et al.

[11] 4,257,030

[45] Mar. 17, 1981

[54] ELECTRONICALLY CODED CYLINDER LOCK AND KEY

[75] Inventors: Rolf Bruhin, Wetzikon; Peter Rütimann, Effretikon, both of Switzerland

[73] Assignee: Bauer Kaba AG, Switzerland

[21] Appl. No.: 22,626

[22] Filed: Mar. 21, 1979

[30] Foreign Application Priority Data

Mar. 29, 1978 [CH] Switzerland .................. 3359789/78

[51] Int. Cl.[3] ........................ E05B 47/06; G06K 7/08

[52] U.S. Cl. .................................. 340/149 R; 70/413; 361/172

[58] Field of Search ....... 340/149 R, 147 MD, 171 R, 340/152 T, 543; 70/413, 279; 255/449; 361/172

[56] References Cited

U.S. PATENT DOCUMENTS

| | | | |
|---|---|---|---|
| 3,634,657 | 1/1972 | Ballard et al. | 235/449 |
| 3,979,647 | 9/1976 | Perron et al. | 340/543 |
| 4,012,583 | 3/1977 | Kramer | 340/149 R |
| 4,112,292 | 9/1978 | Varvel et al. | 235/449 |
| 4,134,539 | 1/1979 | Hopkinson | 235/449 |

FOREIGN PATENT DOCUMENTS

| | | |
|---|---|---|
| 1312942 | 4/1973 | United Kingdom . |
| 1475395 | 6/1977 | United Kingdom . |
| 1514866 | 6/1978 | United Kingdom . |
| 1525033 | 9/1978 | United Kingdom . |
| 1531951 | 11/1978 | United Kingdom . |

*Primary Examiner*—Donald J. Yusko

*Attorney, Agent, or Firm*—Roylance, Abrams, Berdo & Farley

[57] ABSTRACT

In order to determine the identity and authorization of a key which is inserted into a cylinder lock, the key is provided with an information carrier with elements which are magnetically passive and inductively readable and yield permanently stored information. The carrier is fixed to the key blade. A reading head mounted in the lock reads the carrier as the key is moved into or out of the lock. An electronic evaluation circuit uses a micro-processor to interpret the information. The carrier is so designed that alterations made in it after it is coded are immediately detected by the evaluation circuit. A particular relationship of the reading head to the information carrier is described for a particular pattern of loop-shaped information elements on the carrier.

9 Claims, 8 Drawing Figures

Fig.5
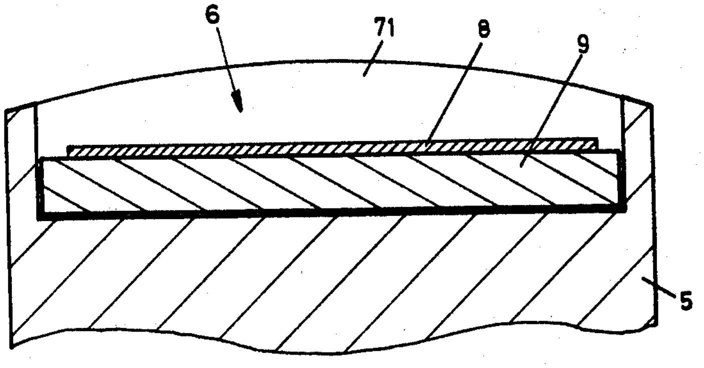
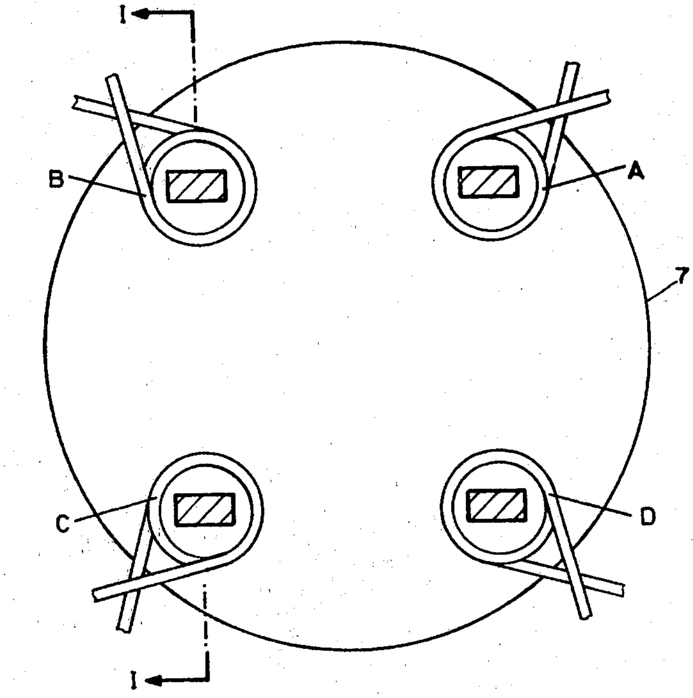
Fig.6

ELECTRONICALLY CODED CYLINDER LOCK AND KEY

BACKGROUND OF THE INVENTION

The invention relates to a cylinder lock and key for establishing an authorization to operate the cylinder lock. The key contains information which can be read by reading devices in the cylinder lock.

Locking systems comprising a plurality of lock cylinders are used not only for locking or unlocking premises or the like, but also in special cases for checking whether the necessary authorization exists. Authorization covers not only time-limited authorization for access to particular premises, but also authorization to remove goods or articles from automatic machines, such as e.g. pumps at filling stations. The known locking systems have mechanical checking of authorization and, as a result, there are very few coding possibilities for such mechanical authorization checking.

DOS No. 2,546,542 describes the arrangement of magnetic means on a key serving to extend the coding possibilities for such an authorization checking. However, these magnetic means have the disadvantage that they can easily be deliberately changed and/or the code rendered visible with simple auxiliary means. Thus, this code provides not much greater security than the known mechanical code arranged in the form of slots and/or holes on the key.

SUMMARY OF THE INVENTION

In the novel lock and key in accordance with the invention, a magnetic passively and inductively readable information carrier for identification of the key is arranged on that part of the key which can be inserted in the lock cylinder.

BRIEF DESCRIPTION OF THE DRAWINGS

FIG. 5 is a cross-sectional view of a fragment of the key of FIG. 1 at the narrow edge of the blade, showing the information carrier of FIG. 2*a*.

FIG. 6 is a partially sectioned plan view of the side of the reading head of FIG. 2*a* which faces the information carrier of FIG. 2*a* on the key of FIG. 1.

DETAILED DESCRIPTION OF THE PREFERRED EMBODIMENTS

Figure 1:
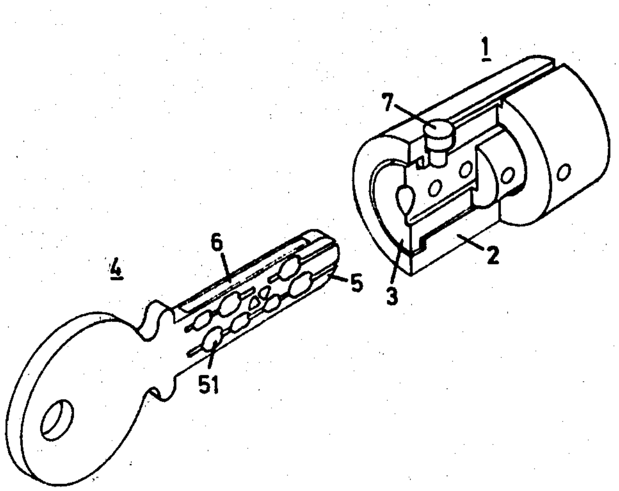
FIG. 1 is an elevated perspective view of a cylinder lock and key in accordance with a preferred embodiment of the present invention.
Figure 2A:
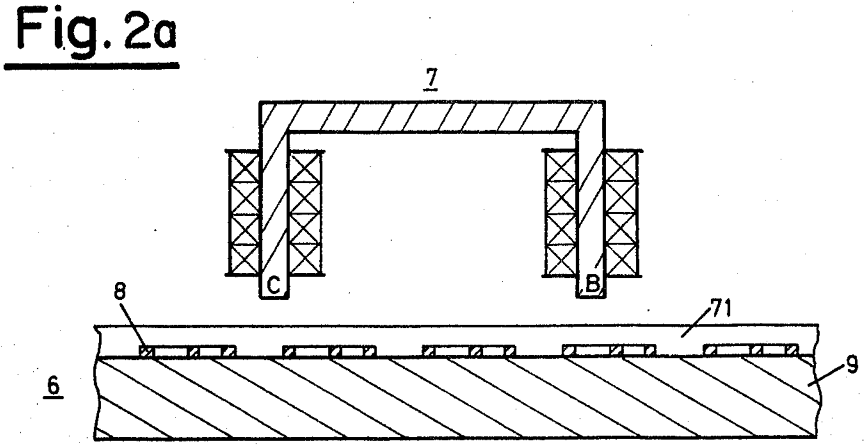
FIG. 2*a* is a side, sectional view of a fragment of an information carrier of the key of FIG. 1, showing coding loop elements of electrically conductive material on an information carrier and showing schematically a reading head for interacting with the coding loop elements.
Figure 2B:
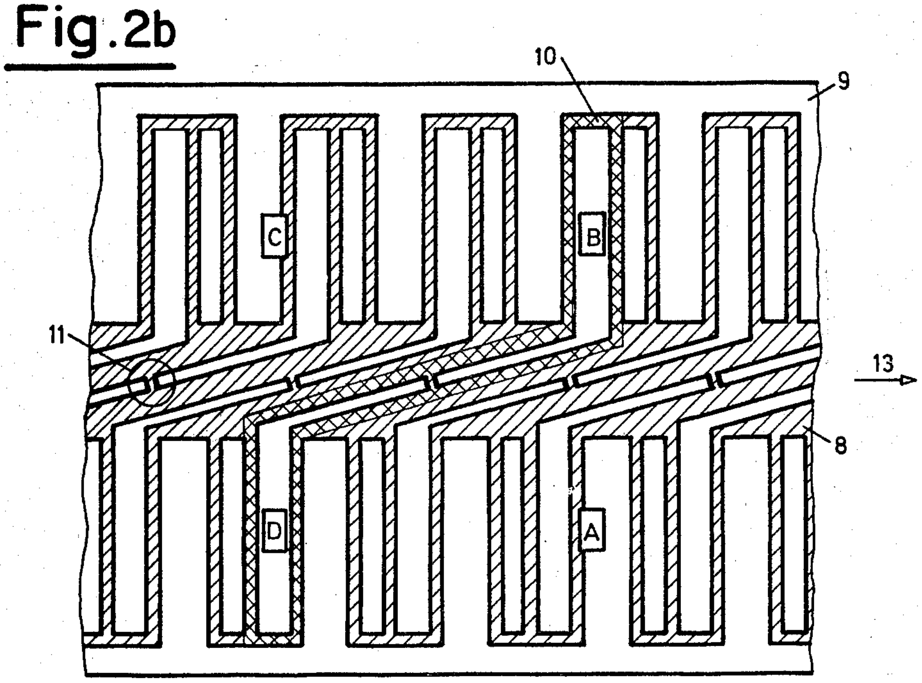
FIG. 2*b* is a top view of the fragment of FIG. 2*a*, showing the pattern of the coding loop elements.
Figure 4:
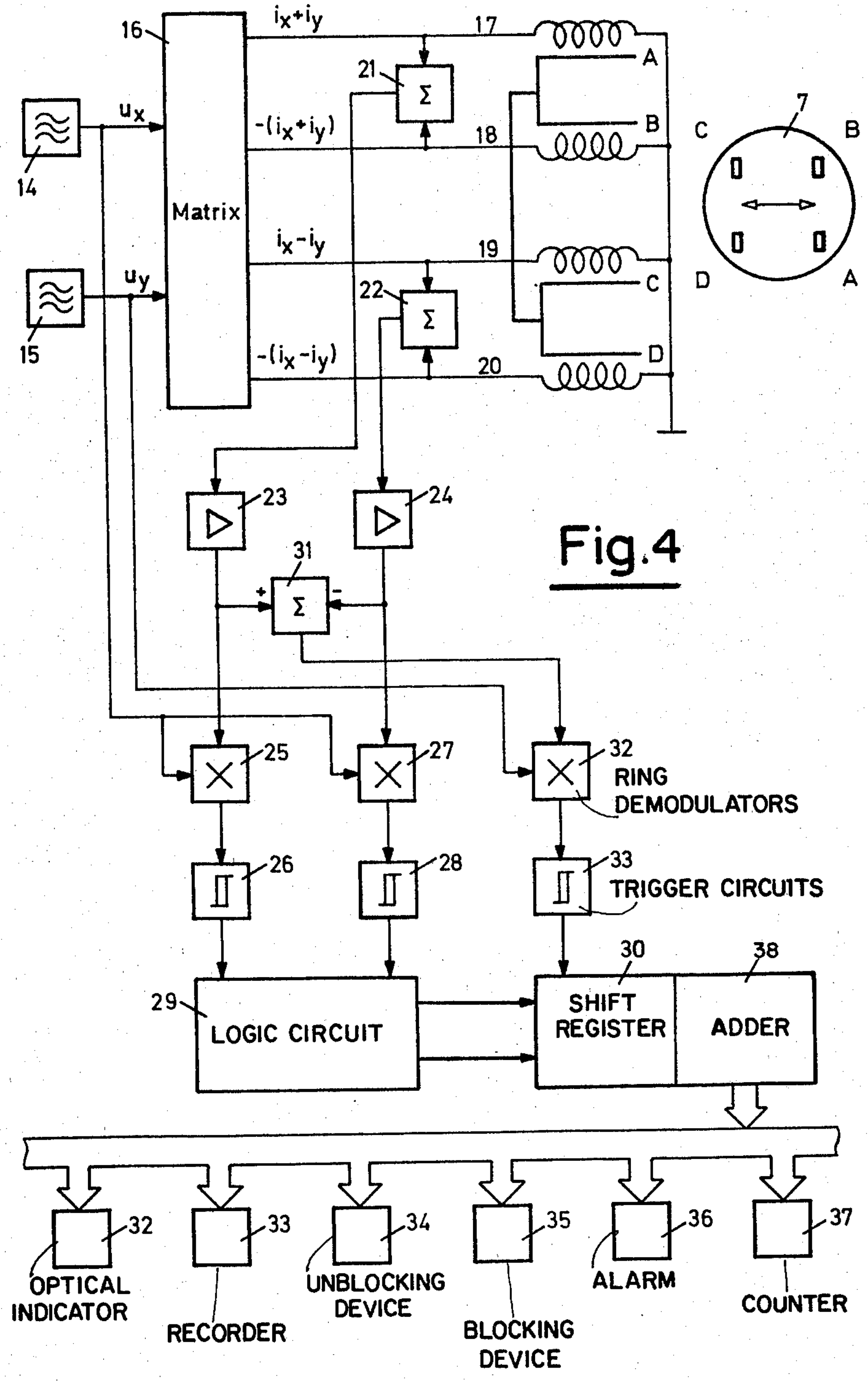
FIG. 4 is a block diagram of an electronic evaluation circuit for processing the information from the reading head of FIG. 2*a*.

In a symbolic sectional view, FIG. 1 shows the cylinder lock 1, which in a per se known manner comprises stator 2 and rotor 3. In the rotor 3, the key 4 with its blade 5, which in per se known manner has a number of recesses and/or holes 51, is used for actuating the not-shown tumbler pins provided in the lock cylinder 1. An information carrier 6, described in greater detail below relative to FIGS. 2*a*, 2*b* and 4, is provided on the narrow side of key blade 5. The width of the information carrier must be narrower than the width of key blade 5. If the key is now inserted in the slot of rotor 3, the information carrier 6 moves with the key 4 past the reading head 7 located in stator 2. As will be described in greater detail hereinafter, this relative movement between information carrier 6 and reading head 7 produces a number of different items of information, such as e.g. the speed and direction of the relative movement, the start and end of the information as to key identification and as to the genuineness or validity of this identification. It is thus possible to immediately establish not only the identity of the key, but also any change in this identity. The signals received by reading head 7 as a result of the relative movement of the information carrier 6 is transmitted by a not-shown line to the electronic evaluation circuit shown in FIG. 4, in which it is evaluated in such a way that the identity of the key and its authorization or any forging can be established.

In the embodiment of FIG. 1, key 4 is represented in such a way that the recesses 51 are located on the wide side of key blade 5 and the information carrier 6 on the narrow side. Clearly, the information carrier 6 can be arranged on the wide side of the blade in the case of a key which has protuberances and depressions for actuating the tumbler pins in the lock cylinder on the narrow side of its blade. The arrangement of the reading head 7 in cylinder lock 1 and the information carrier 6 on key blade 5 can therefore be subsequently effortlessly and easily incorporated into any existing locking system.

FIG. 2*a* shows in a partial sectional view the reading head 7, with two of its four read windings A, B, C, D which, according to FIG. 6, are connected to the electronic evaluation circuit. FIG. 2*a* does not show the electrical connecting lines. In FIG. 2*a*, reading head 7 is sectioned along the section line I—I of FIG. 6. The key blade 5 with information carrier 6 is located a certain distance below the reading head 7. The information carrier 6 is covered by a protective layer 71. This protective layer 71, which will be discussed in detail in conjunction with FIG. 6, comprises an electrically non-conductive and magnetically passive material, such as, for example, a diamagnetic material permitting reading through it by magnetic field excitation. The information carrier 6 comprises a particular printed circuit pattern 8, whose material is electrically conductive and an insulator 9 which is electrically non-conductive and preferably has ferromagnetic properties.

FIG. 2*b* shows the pattern 8 of electrically conductive material arranged in a specific manner on insulator 9. In the present embodiment, the pattern 8 comprises a series of loop-like elements 10. Such an element 10 is shown particularly clearly in FIG. 2*b*. Pattern 8 is coded by opening the short-circuit bridges 11 of the individual loop-like elements 10. Each element 10 is a bit which, depending on whether short-circuit bridge 11 is present or not, can be logic "1" or "0". All the bits of loop pattern 8 on information carrier 6 are subdivided into an information code and a test code. The information code establishes the identity of the key. The test code gives information on whether the identity is genuine or a forgery. According to FIG. 2*b*, it is assumed that the uncoded pattern 8 still contains all short-circuit bridges 11 and that during coding the bridges 11 are removed by grinding, scratching, burning away, evaporating or etching. The test code indicates in the form of a binary number how many short-circuit bridges 11 in the information code are opened. Since any damage or modification leads to the opening of further loop-like elements 10 with a resulting increase in the number of interruptions given in the test code, the binary test code then no longer agrees, so that the key can then be recognised as invalid. In the test code, one short-circuit bridge 11 corresponds to a logic 1, i.e. this binary number can only become smaller, and never larger, through damage to the test code. As a result, any existing valid code can only be changed into an invalid code.

For reasons of clarity, in FIG. 2*b* the pole locations of the read windings A, B, C, D of reading head 7 are shown. With respect to the poles of the read windings of the reading head 7, pattern 8 is either moved in a direction indicated by arrow 13 or in the opposite direction. In the present embodiment, it is assumed that direction 13 is the direction of movement occurring on inserting key 4 into lock 1 (FIG. 1). Elements 10 of pattern 8 are so shaped and constructed that one pair of poles (e.g. read windings A, B) has a 90° geometrical phase displacement to the other pair of poles of read winding C, D, while the pair of poles of read windings B, C has a 180° geometrical phase displacement to the other pair of poles of read windings A, D. This arrangement can also be achieved through spacings of the poles of read windings A, B, C, D of reading head 7 having other spatial dimensions. It is not necessary in this case to change the pattern 8 of the loop-like elements 10 in any way. It is important that the relationship between the pattern 8 and the pairs of poles of reading head 7 is dimensioned in such a way that the above-defined phase displacements are obtained. In the embodiment of FIG. 2*b*, these relationships are represented through the pole of read winding B being arranged within loop 10, while the pole of read windings A is already partly outside that loop. The same applies in the case of the poles of read winding C and D, but the sign is reversed. This means that there is a 180° phase displacement between one pair of poles (B, C) and the other pair of poles (A, D). The same arrangement of the four poles also gives a 90° phase displacement between the pair of poles of read windings A, B and the pair of poles of read windings C, D. In principle, it is not necessary for the pattern 8 to be formed from a series of loop-like elements 10. Pattern 8 can also comprise discrete or individual loop-like or area elements 10.

Figure 3A:
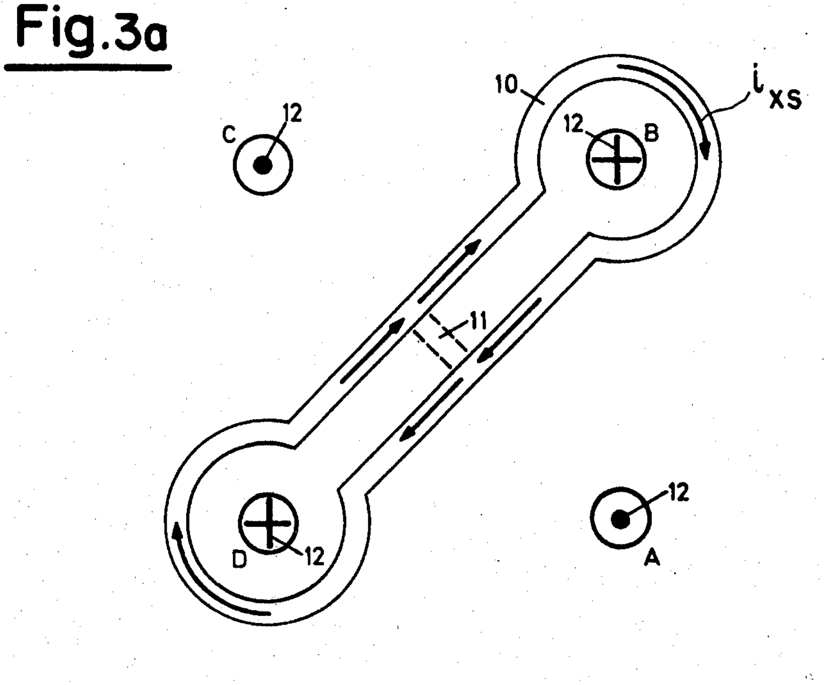
FIG. 3*a* is schematic circuit diagram of one of the coding loop elements of FIG. 2*b* in the process of being read by the reading head of FIG. 2*a*.
Figure 3B:
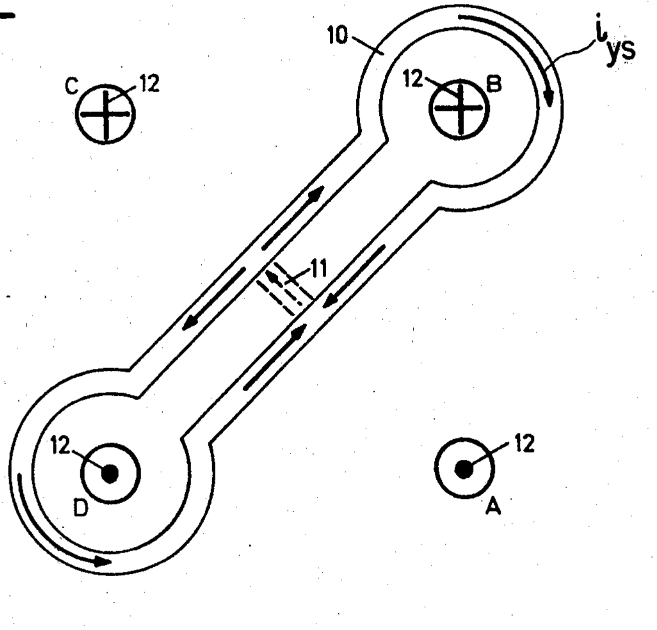
FIG. 3*b* is a schematic circuit diagram of another of the coding loop elements of FIG. 2*b* in the process of being read by the reading head of FIG. 2*a*.

FIGS. 3*a*, 3*b* show the production of information signals from the loop-like elements 10 of FIGS. 2*a* and 2*b*.

FIG. 3*a* shows the arrangement of a loop 10 under two poles of read windings B and D, the latter being excited in such a way that there is obtained a magnetic flux 12 which is of equal phase with the two poles. This is indicated by the cross in FIG. 3*a*. Magnetic flux 12 flows back across the electrical insulator 9 with ferromagnetic properties of the information carrier 6 to the poles of the two other read windings A and C. In loop 10, the magnetic flux 12 produces a secondary current $i_{xs}$ flowing in the direction of the arrow through loop 10. The short-circuit bridge 11 (see also FIG. 2*b*) of loop 10 can be present or absent. This changes nothing as regards the flow of secondary current in loop 10. FIG. 3*a* shows the state whereby there is a given position between reading head 7 and information carrier 6 of key 4 giving information to the evaluation circuit shown in FIG. 4. Reading head 7 can also read the present information as in FIG. 3*b*. To this end, read windings B and D are excited in such a way that in the pole of read winding B a magnetic flux 12 can flow in a given direction across electrical insulator 9 to the poles of the other read windings A and D. In this case, read winding C is excited in the same way, so that a magnetic flux with the same direction results. With this direction configuration of magnetic flux 12, a secondary current $i_y$ can flow in loop 10 if short-circuit bridge 11 is present. In this case, the current flow directions in both halves of loop 10 are opposite to one another. This is indicated by arrows. If short-circuit bridge 11 is not present, no secondary $i_{ys}$ can flow. It is therefore apparent that by a removing of the short-circuit bridge 11, a code can be provided in pattern 8 in given manner (FIG. 2*b*). This code gives the information on the identification and checking as to whether or not a forgery exists. It is also pointed out that in FIGS. 3*a* and 3*b* the direction of magnetic flux 12 represents a momentary value of an alternating field. By means of FIGS. 2*b*, 3*a* and 3*b*, an embodiment for obtaining information was described in which the pattern 8 represents a single interrogation track. Thus, the poles of interrogation windings B, D of read head 7 are used in two ways (FIGS. 3*a* and 3*b*). However, there is also a possibility of subdividing the pattern 8 on information carrier 6 into two or more spatially separated tracks. In this case, it is not necessary for the poles of reading head 7 to be used twice. The two or more tracks of pattern 8 can either be located on a single information carrier 6 or on a plurality of information carriers. For example, information carrier 6 can be arranged on blade 5 of key 4 in the manner shown in FIG. 1, and the other information carrier can be on the opposite narrow side of blade 5 or, if holes 51 are not present, on the wide side of blade 5. In this case, there are required the same number of reading heads 7 as information tracks.

FIG. 4 shows an embodiment of an evaluation circuit in which the two oscillators 14, 15 produce voltages $u_x$ and $u_y$ with different frequencies and provide them on the following matrix 16. Matrix 16 can be equipped with different types of active or passive electronic components. In the case of the present embodiment, it is assumed that the matrix comprises high-valued resistors. It is constructed in such a way that the sum of currents $i_x+i_y$ appear on line 17 and is supplied to exciting winding A. The frequency of current $i_x$ corresponds to that of oscillator 14 and frequency of current $i_y$ to that of oscillator 15. The frequencies of the sum current $i_x+i_y$ on line 17 are superimposed. The same sum current as is in line 17 appears also in line 18, but with a negative sign, as indicated in FIG. 4. This sum current passes to read winding B. The differential current $i_x-i_y$ of the two voltages from oscillators 14 and 15 appears on line 19. The frequencies of these oscillators are correspondingly superimposed in the differential current of line 19. The differential current is fed to read winding C. The same differential current as is in line 19 appears also in line 20, but with a negative sign, as shown in FIG. 4.

The differential current of line 20 is fed to read winding D. Thus, read windings A, B, C, D of reading head 7 are excited in accordance with the currents and in the loop-like elements 10 of pattern 8 of information carrier 6 produce secondary currents indicated e.g. by arrows in FIGS. *3a* and *3b*. These secondary currents produce feedbacks in the read windings A, B, C, D which change the impedance of those windings. This leads to voltage changes in currents supplied to adders 21, 22. Each adder has an output which is supplied to a following amplifier 23, 24. The voltage fluctuation with the frequency mixture from oscillators 14 and 15 and which comes from amplifier 23 is so processed in the following ring demodulator 25 that the component having the frequency of oscillator 14 is filtered out, demodulated, and fed to the following Schmitt trigger 26. This takes place in ring demodulator 25, due to the fact that oscillator 14 supplies its voltage $u_x$ not only to matrix 16, but also to ring demodulator 25. The voltage fluctuations with the frequency mix of oscillators 14, 15 and coming from amplifier 24 are so processed in the following ring demodulator 27 that the component with the frequency of the oscillator 14 is filtered out, demodulated, and fed to the following Schmitt trigger 28. Therefore, oscillator 14 is also connected to ring demodulator 27.

The signals coming from the two Schmitt triggers 26 and 28 are two pulse sequences displaced by 90° which represent the position of the loop-like elements 10 under reading head 7 and the speed and direction of the relative movement between information carrier 6 and reading head 7. These two signals are fed to logic circuit 29, which processes them in such a way that the storage locations in a following shift register 30 are filled in the same way as key 4 is introduced into the slot of rotor 3 of lock cylinder 1. Shift register 30 represents a precise electronic diagram of the mechanical position of the key relative to the lock cylinder. This means that it is established electronically together with the position of the key which it momentarily occupies whether the key is moving in or out of the lock. The logic circuit 29 is of a generally known type which corresponds to the known principle of length measurement in machine tools.

In FIG. 4, the two outputs of amplifiers 23 and 24 are connected with a ring demodulator 32 via an adder 31. The adder 31 sums the output signal (voltage fluctuations of read windings A, B) of amplifier 23 and the inverted output signal (voltage fluctuations of read windings C, D) of amplifier 24, this being represented in the drawing by the mathematical symbols "+,−". The output signal of adder 31 is fed to ring demodulator 32, which filters from the voltage fluctuations only that part having the frequency of oscillator 15. This is followed by demodulation. Therefore, ring demodulator 32 is connected to oscillator 15, which supplies its voltage $u_y$ not only to matrix 16 but also to ring demodulator 32. The output signal of ring demodulator 32 is supplied to Schmitt trigger 33. The signal from Schmitt trigger 33 contains the information from the information carrier 6 of key blade 5. Together with the already described signals from logic circuit 29, this information is fed into shift register 30 and in the latter is stored in the correct position. When key 4 has been completely inserted into lock cylinder 1, the information is completely available in the shift register, without regard to the speed with which the key is inserted into the slot of rotor 3. Thus, it does not matter whether key 4 is introduced continuously, or rapidly, slowly, in a jerky manner or in short reciprocating movements into the slot of rotor 3 of cylinder lock 1. At all times, shift register 30 stores the information, which in the part of a pattern 8 of information carrier 6 on key 4 is just being moved past reading head 7 in the insertion movement direction. When key 4 has been completely inserted into lock cylinder 1, calculator or adder 38 processes the information of shift register 30 so as to establish whether the particular key has an authorization, e.g. for opening the doors, for removing information from data banks, for removing goods from vending or dispensing machines, for using equipment, tools or instruments, etc. At the same time, this information establishes the authority of the key. It is pointed out here that adder 38 compares the information content of shift register 30 with data giving information on the authorization and authority. The adder also establishes whether the information stored in shift register 30 is correct or falsified.

Calculator or adder 38 is presently commercially available and is marketed as a microprocessor by well known computer companies such as INTEL. In accordance with the result of the checking, adder 38 supplies signals to different peripheral equipment. FIG. 4 gives a selection of such peripheral equipment. Thus, the calculator can e.g. give an optical indicating device 32 the result of the authorization, identification and correctness of the information and the time at which this took place. Such an indicating device can e.g. be centrally installed in a control room. The calculator can supply the same output signals to a recorder 33, constructed either as a printer or as a store (magnetic store, punched tape, microfilm, etc). If the result from calculator 38 is in order, it supplies a signal to the unblocking device 34, e.g. located on the door to be unblocked. The unblocking device 34 can also be provided on machines for vending or dispensing goods or for moving information from data banks. However, if the checking result of calculator 38 is negative, a signal is supplied to blocking device 35 arranged at the same location as indicated hereinbefore. In addition, in the case of a negative result an alarm device 36 can be operated. This alarm device can be set off if there is no authorization, if falsified information appears, or if there is used a sought identified in the lost property register. Calculator 38 can also be connected to a counting device 37, which is preferably used on machines for dispensing goods, as well as on equipment, vehicles, etc. At the end of a given time, e.g. a month, an abstract from this counting device is supplied to the owner of the key. In the case of the present embodiment, only a limited number of peripheral devices can be used. It is naturally an aim of the invention to be able to use other peripheral devices. To provide a better understanding of the operation of calculator 38, it is pointed out that the criteria for the authorization and the identification are located in a store, which can be arranged either within the calculator 38 or in the vicinity thereof. The content of the store can obviously be changed on a time basis, so that not only an identification, but also a time-dependent checking of authorizations can take place. The electronic circuit of FIG. 4 has hitherto been described in such a way that the two oscillators 14 and 15 supply voltages $u_x$, $u_y$ with different frequencies. However, these two oscillators can also be modified in such a way that they supply voltages $u_x$, $u_y$ with the same frequency. The phase positions of these two voltages must then, however, be displaced by a constant angle relative to one another, preferably $\pi/2$. The impedance change in read windings A, B, C, D due to the secondary currents in loop patterns 8 on information carrier 6 leads not only to an amplitude change, but also to a phase change (modulation). Since the ring demodulators 25, 27, 32 are not only a frequency-sensitive filter, as described in the first embodiment, but are also a phase-sensitive filter at the output of Schmitt triggers 26, 28, 33 with the same circuit principles, the same signals are obtained as in the embodiment with two different frequencies.

The use of a time division multiplex leads to a further variant of the embodiment of FIG. 4 for reading the information of loop pattern 8 with reading head 7 and producing it in corresponding pulse sequences at the outputs of Schmitt triggers 26, 28, 32. The upper part of the circuit of FIG. 4 is only slightly changed for this variant. The two oscillators 14, 15 are replaced by an oscillator for exciting the read windings A, B, C, D. Matrix 16 is replaced by a multiplex switch which at short time intervals switches the oscillator on lines 17, 18, 19, 20 in such a way that alternatively the two position signals and the information signal are measured by read windings A, B, C, D. The ring demodulators 25, 27, 32 can be replaced by ordinary rectifiers. Behind each of the Schmitt triggers 26, 28, 32 is connected a storage device which stores the signal of the immediately preceding time interval. The storage device receives its setting instructions in the same rhythm as that in which the multiplex switch is switched over.

FIG. 5 shows a sectional view of part of key blade 5. A slot approximately 2.5 mm wide is made in the narrow side of key blade 5. The information carrier 6 comprising the insulator 9, the pattern 8 and the protective layer 71 is inserted in this slot. The individual parts of the information carrier 6 are joined together prior to insertion. The joining can either be made by means of an adhesive material, such as e.g. polymerising synthetic resins or by melting or by evaporating on and/or defusing. These methods are known, so that no more detailed information is required. However, it is pointed out that the protective layer 71 and pattern 8 must be joined together in such a way that pattern 8 is destroyed if an attempt is made to remove the protective layer.

Glass, ceramics, metal oxides, e.g. aluminium oxide or silicon dioxide or the like can be used as the protective layer material. The protective layer is required to be chemically and mechanically resistant and magnetically and electrically neutral. It must also be opaque and have approximately the same heat expansion coefficient as information carrier 6. It is again pointed out here that the information carrier 6 comprising electrical insulator 9, the pattern 8 and the protective layer 71 has a thickness of approximately 0.5 mm.

FIG. 6 shows the reading head 7 of information carrier 6. The diameter of the reading head 7 is approximately 3 mm. It is easily possible to see the active surfaces of the poles around which there are arranged the read windings A, B, C, D. The ends of the read windings are connected to the evaluation circuit in the manner shown in FIG. 4. The poles, or active surfaces, of the four read windings are positioned relative to pattern 8 of information carrier 6 in the same way as in the example shown in FIGS. 2*a* and 2*b*.

We claim:

1. An improved lock and key combination wherein the key is insertable in the lock and has coded information for identification and control of access of the key, comprising an information carier mounted on said key comprising an electrically nonconductive and magnetically conductive substrate, and an electrically conductive pattern means carried by said substrate for carrying a code containing desired information;

a reading device positioned in the lock;

electronic control circuit means coupled to said reading device for producing an alternating magnetic field to generate an electric alternating current in said pattern means; and electronic evaluation circuit means coupled to said reading device for receiving feedback signals representation of said alternating current for recognition of said key.

2. A lock according to claim 1, wherein said electrically conductive pattern means is formed as a plurality of electrically conductive loop elements arranged on said electrically non-conductive and magnetically conductive substrate whereby said alternating magnetic field generates said alternating current in each of the loop elements.

3. A lock according to claim 2, wherein each of said electrically conductive loop elements arranged on said electrically non-conductive and magnetically conductive substrate means represents one information bit and all said elements together give a security code containing a test bit and an identification bit, the test bit representing the cross-sum of the digits of an inverted identification code as a binary number.

4. A lock according to claim 1, wherein said electrically conductive pattern means is shaped as a plurality of electrically conductive plain shaped loop elements arranged in a predetermined manner on said electrically non-conductive and magnetically conductive substrate, and wherein said reading device includes a plurality of coils, whereby said alternating magnetic field controlled by said electronic control circuit means and produced by said coils generates said alternating current in each of the loop elements and produces feedback to said evaluation circuit.

5. A lock according to claim 1, wherein said reading head in the lock and said information carrier on the key are formed and arranged with respect to one another in such a way that during the relative movement between the key and the lock cylinder there are produced two timing signals representing the direction of movement and speed of movement and one information signal representing identification.

6. A lock according to claim 1, wherein said electrically conductive pattern means of information elements is fixed to said information carrier and covered with a protective layer.

7. An apparatus to test the identification and the access authority of a key coded by electrically conductive pattern means arranged on an electrically non-conductive and magnetically conductive substrate means, wherein said key is inserted in a lock having a reading device for reading the coded information on said key activated by an electronic exciting circuit and supplying electrical signals representing said information to an electronic evaluation circuit, and wherein said exciting circuit comprises:

two oscillators which generate voltage signals with two different frequencies and supply said voltage signals to read windings of a reading head of said reading device, and said evaluation circuit comprises:

circuit means for transmitting voltage fluctuations produced in the lines of said read windings as feedback representative of said elements of said information carrier to a storage device such that the content of said storage device gives a precise indication of the position of the key relative to the lock and of the coded information from said information carrier.

8. An apparatus to test the identification and the access authority of a key coded by electrically conductive pattern means arranged on an electrically non-conductive and magnetically conductive substrate means, wherein said key is inserted in a lock having a reading device reading the coded information on said key activated by an electronic exciting circuit and supplying electrical signals representing said information to an electronic evaluation circuit, and wherein said exciting circuit comprises:

two oscillators which generate voltage signals with the same frequency and different phase and supply said signals to read windings of a reading head of said reading device, and said evaluating circuit comprises:

circuit means for transmitting the voltage fluctuations produced on the lines of said read windings as feedback representative of information elements of said information carrier to a storage device such that the stored content of said storage device gives a precise indication of the position of the key relative to the lock and of the coded information from said information carrier.

9. An apparatus to test the identification and the access authority of a key coded by electrically conductive pattern means arranged on an electrically non-conductive and magnetically conductive substrate means, wherein said key is inserted in a lock having a reading device reading the coded information on said key activated by an electronic exciting circuit and supplying electrical signals representing said information to an electronic evaluation circuit, and wherein said exciting circuit comprises:

an oscillator which generates voltage signals which are fed to read windings of a reading head of said reading device in a given time sequence by means of a time division multiplex switch, and said evaluating circuit comprises:

circuit means for transmitting voltage fluctuations produced in the lines of said read windings as feedback from information elements of said information carrier to a storage device such that the stored content of said storage device gives a precise indication of the position of the key relative to the lock and of the coded information from said information carrier.

* * * * *